United States Patent Office 3,498,921
Patented Mar. 3, 1970

3,498,921
HYDRAULIC BRAKE FLUID SOLVENT
Gayle D. Edwards, Austin, Tex., and Orvis V. Larsen, Richmond, Calif., assignors to Jefferson Chemical Company, Inc., Houston, Tex., a corporation of Delaware
No Drawing. Filed Mar. 15, 1965, Ser. No. 439,963
Int. Cl. C09k 3/02
U.S. Cl. 252—73
2 Claims

ABSTRACT OF THE DISCLOSURE

An improved brake fluid base containing a solvent of glycol ethers of the formula:

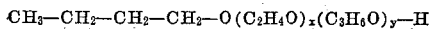

or

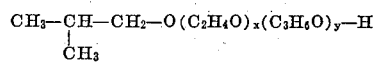

This invention is concerned with novel glycol ethers based on butyl alcohols, which glycol ethers have properties that make them highly desirable for use as solvents in the formulation of hydraulic brake fluids. This invention is also concerned with the hydraulic brake fluids formulated from these glycol ethers.

It is well known that hydraulic brake fluids usually comprise three major components: a solvent, a rubber-swell inhibitor and a lubricant. Finished brake fluids contain, in addition, minor amounts of various additives such as, for example, oxidation inhibitors and corrosion inhibitors. For purposes of this application the mixture of the major components without the minor additives will be referred to as a brake fluid base. In preparing this brake fluid base, the particular solvent, rubber-swell inhibitor and lubricant employed and the relative amounts of each are carefully chosen in order to obtain a brake fluid meeting particular specifications.

The solvent generally comprises 55–75 wt. percent of the brake fluid base. Since the solvent constitutes such a large percentage of the base, its properties greatly affect the properties of the formulated fluid. Among the properties desired in a solvent are a freezing point of less than —60° F., a low viscosity at —40° F. and a reflux boiling point of from about 300° F. to more than 400° F., depending upon the type fluid being formulated.

We have now discovered a new class of glycol ether solvents having very high reflux boiling points and excellent low temperature characteristics. These new solvents are mixed ethylene oxide-propylene oxide adducts of n-butyl or isobutyl alcohols containing at least one-half mol of each oxide and a total of 2½ to 3½ mols of oxide per mol of alcohol and prepared using an acidic alkoxylation catalyst. The oxides may be added in a block or heteric manner.

Alkoxylation reactions are normally conducted employing an alkaline catalyst such as, for example, sodium hydroxide or potassium hydroxide. However, when potassium hydroxide was employed as catalyst in the preparation of mixed adducts of the butyl alcohols, the products obtained had freezing points above —60° F. Such adducts are not suitable for use in the formulation of hydraulic brake fluids.

On the other hand, when acidic catalysts are employed the adducts as described hereinabove are liquids at temperatures of —60° F. These adducts also have high reflux boiling points and are suitable for use in the formulation of hydraulic brake fluids meeting SAE 70R1 specifications without further treatment. In order to obtain a solvent suitable for use in the formulation of hydraulic brake fluids meeting SAE 70R3 specifications, it is necessary to remove only about 5% or less of the low-boiling components of the adduct.

If ethylene oxide is used alone, the adducts are solids at —60° F. For this reason, it is necessary that at least one-half mol of propylene oxide be employed and preferable that at least one mol of propylene oxide be used. As with other alkylene oxide adducts, these glycol ethers are complex mixtures and the cited amounts of oxides in the molecule are merely averages. Such mixtures are best represented by the formulae:

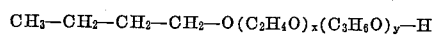

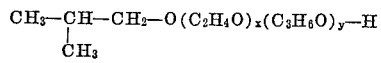

wherein $x$ and $y$ are each at least one-half, the sum of $x$ plus $y$ is from 2½ to 3½ and the oxyethylene and oxypropylene groups are arranged in any sequence. For purposes of this application the same formulae will also be used to represent the high boiling residue obtained by removing no more than about 5% of the adduct as light ends. The removal of this small amount of low-boilers does not substantially change the ratios of the three reactants in the product.

In preparing the present ethers a mixture of the alcohol and from about 0.5 to about 5 wt. percent acidic catalyst based on the weight of alcohol is heated to a temperature of 25°–150° C. The oxides are then added slowly at this temperature as they react. The catalyst is neutralized by the addition of an alkaline material such as an alkaline earth metal hydroxide or an alkali metal hydroxide and the salts formed are removed by filtration. If the solvent is for use in a brake fluid meeting SAE 70R3 specifications, the low boiling components are stripped from the product until the residue has a reflux boiling point of 400° F. or higher. Generally, it is necessary to remove no more than about 5% of the product to obtain such a residue.

Acidic alkoxylation catalysts are well known to those skilled in the art. Examples of such catalysts include sulfuric acid, phosphoric acid and Lewis acids such as stannic chloride and boron trifluoride. Lewis acids, especially boron trifluoride, are the preferred catalysts.

A series of adducts was prepared in accordance with the above procedure employing boron trifluoride as catalyst. The properties of these adducts are set forth in Table 1. The alcohol employed in preparing the first adduct was isobutyl alcohol, while n-butyl alcohol was used in the remainder of the adducts. The properties of the total adduct as well as the properties of the high-boiling residue are given. The high-boiling residue was obtained by removing the indicated amount of light ends.

TABLE 1

|  | 2 EO + 1 PRO | 2 EO + 1 PRO | 1 EO + 2 PRO | 1 PRO + 2 EO | 1½ PRO + 1½ EO | 2 PRO + 1 EO |
|---|---|---|---|---|---|---|
| Total Product: |  |  |  |  |  |  |
| Reflux boiling point, °F | 333 | 347 | 364 | 364 | 363 | 373 |
| Viscosity at −40° F., cs | 809 | 481 | 497 | 463 | 534 | 590 |
| Appearance after 24 hrs. at −60° F | Liquid | Liquid | Liquid | Liquid | Liquid | Liquid |
| High Boiling Residue: |  |  |  |  |  |  |
| Wt. percent lights removed | 5 | 3 | 2 | 2 | 1 | 1 |
| Reflux boiling point, °F | 420 | 426 | 420 | 420 | 420 | 422 |
| Viscosity at −40° F., cs | 999 | 576 | 591 | 511 | 555 | 601 |
| Appearance after 24 hrs. at −60° F | Liquid | Liquid | Liquid | Liquid | Liquid | Liquid |

It is apparent from the data in the table that the viscosity of the adduct based on isobutyl alcohol is somewhat higher than the viscosities of the adducts based on n-butyl alcohol. For this reason, n-butyl alcohol is the preferred starting material. In every case the reflux boiling point of the total product was sufficiently high to prepare a hydraulic brake fluid meeting SAE 70R1 specifications. No more than 5% light ends had to be removed in order to obtain a solvent suitable for use in the formulation of brake fluids meeting SAE 70R3 specifications.

Typical brake fluid formulations and properties of these formulations are shown in Table 2. These formulations were designed to meet SAE 70R3 specifications and those specifications are included for comparison. The solvent employed in each case was the high-boiling residue of the indicated adduct. In those formulations where inhibitors are included, the amount of inhibitor is based on the total weight of brake fluid base.

TABLE 2

|  | 1 | 2 | 3 | 4 | 5 | 6 | SAE 70R3 Specifications |
|---|---|---|---|---|---|---|---|
| Formulation, wt. percent: |  |  |  |  |  |  |  |
| Solvent | ¹ 86.8 | ² 90 | ¹ 80 | ¹ 73.3 | ¹ 84 | ¹ 80 |  |
| Diethylene glycol | 13.2 | 10 | 10 | 10 | 16 | 20 |  |
| PPG-2000 |  |  |  | 10 |  |  |  |
| PPG-750 |  |  |  |  | 16.7 |  |  |
| Triethanolamine | 0.1 | 0.1 |  |  | 0.1 | 0.1 |  |
| Bisphenol A | 0.3 | 0.3 |  |  | 0.3 | 0.3 |  |
| Properties: |  |  |  |  |  |  |  |
| Reflux boiling point, °F | 400 | 401 | 410 | 410 | 405 | 420 | 375 min. |
| Viscosity at −40° F., cs | 968 | 1,717 | 1,438 | 1,783 | 1,050 | 1,185 | 1,800 max. |
| Evaporation test, percent residue | 36.2 |  |  |  |  | 45.3 | 20 min. |
| Natural rubber swell, in |  |  |  |  |  | 0.040 | 0.005–0.05. |
| G.R.S. rubber swell, in |  |  |  |  |  | 0.044 | 0.005–0.05. |
| SAE corrosion test—metal loss (mg./cm.²): |  |  |  |  |  |  |  |
| Tin |  |  |  |  |  | 0.035 | 0.2 max. |
| Steel |  |  |  |  |  | ³ −0.013 | 0.2 max. |
| Aluminum |  |  |  |  |  | 0.0 | 0.1 max. |
| Cast iron |  |  |  |  |  | ³ −0.30 | 0.2 max. |
| Brass |  |  |  |  |  | 0.035 | 0.5 max. |
| Copper |  |  |  |  |  | 0.06 | 0.5 max. |

¹ n-Butyl alcohol + 1 PrO + 2 EO.   ² Isobutyl alcohol + 2 EO + 1 PrO.   ³ Gain.

As stated hereinabove, the solvent is the major component of a brake fluid base and comprises from about 55 to about 75 wt. percent of the base. The amount of rubber-swell inhibitor used will normally depend upon the protection needed but generally ranges from about 8 to about 22 wt. percent. The lubricant will normally comprise from about 15 to about 25 wt. percent of the base.

The solvent component of the present invention may be employed with a wide variety of rubber-swell inhibitors and lubricants in the preparation of a brake fluid base. Examples of rubber-swell inhibitors and lubricants are well known to those skilled in the art. Commonly used rubber-swell inhibitors include propylene glycol, dipropylene glycol, ethylene glycol, diethylene glycol and hexylene glycol. Lubricants that are normally employed include natural products such as, for example, castor oil and alkylene oxide adducts thereof, as well as synthetic lubricants, generally polyoxyalkylene ethers. These polyoxyalkylene ethers include polypropylene glycols of various molecular weights as well as propylene oxide adducts of polyhydric compounds such as, for example, glycerine. Ethylene oxide may be mixed with the propylene oxide in a heteric or blocked manner.

It is an added and wholly unexpected advantage of the present solvents that satisfactory hydraulic brake fluid bases may be formulated employing just the solvent and the rubber-swell inhibitor without the lubricant. Such a brake fluid base will contain from about 78 to about 92 wt. percent solvent and, correspondingly, from about 22 to about 8 wt. percent rubber-swell inhibitor.

Having thus described our invention, we claim:

1. An improved hydraulic brake fluid base consisting essentially of 55–75 wt. percent solvent, 8–22 wt. percent rubber-swell inhibitor selected from the group consisting of propylene glycol, dipropylene glycol, ethylene glycol, diethylene glycol and hexylene glycol and 15–25 wt. percent of polypropylene glycol as a lubricant, wherein the solvent comprises a glycol ether represented by one of the formulae:

$$CH_3-CH_2-CH_2-CH_2-O(C_2H_4O)_x(C_3H_6O)_y-H$$

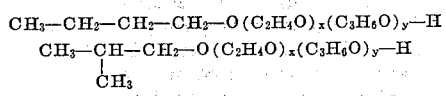

wherein $x$ and $y$ are at least one-half, the sum of $x$ plus $y$ is 2½ to 3½, the oxyethylene and oxypropylene groups are arranged in any sequence, and the glycol ether was obtained by the addition of ethylene oxide and propylene oxide to an alcohol selected from the group consisting of isobutyl alcohol and n-butyl alcohol in the presence of about 0.5 to about 5 wt. percent of an acidic alkoxylation catalyst selected from the group consisting of sulfuric acid, phosphoric acid and Lewis acids at a temperature of about 25° to about 150° C.

2. A hydraulic brake fluid base consisting essentially of 78–92 wt. percent solvent and 8–22 wt. percent rubber-swell inhibitor selected from the group consisting of propylene glycol, dipropylene glycol, ethylene glycol, diethylene glycol and hexylene glycol, said sovent being a gycol ether represented by the formulae:

$$CH_3-CH_2-CH_2-CH_2-O(C_2H_4O)_x(C_3H_3O)_y-H$$

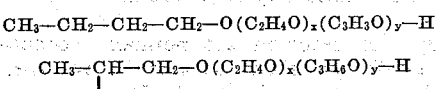

wherein $x$ and $y$ are each at least one-half, the sum of $x$ plus $y$ is 2½ to 3½, the oxyethylene and oxypropylene groups are arranged in any sequence and the glycol ether was obtained by the addition of ethylene oxide and propylene oxide to an alcohol selected from the group consisting of isobutyl alcohol and n-butyl alcohol in the presence of about 0.5 to about 5 wt. percent of an acidic alkoxylation catalyst selected from the group consisting of sulfuric acid, phosphoric acid and Lewis acids at a temperature of about 25° to about 150° C.

References Cited

UNITED STATES PATENTS

| | | | |
|---|---|---|---|
| 2,425,755 | 8/1947 | Roberts et al. | 260—615 |
| 3,324,035 | 6/1967 | Nankee et al. | 252—78 |

LEON D. ROSDOL, Primary Examiner

M. HALPERN, Assistant Examiner

U.S. Cl. X.R.

252—75, 78; 260—615

UNITED STATES PATENT OFFICE

CERTIFICATE OF CORRECTION

Patent No. 3,498,921      Dated: March 3, 1970

Gayle D. Edwards and Orvis V. Larsen
Assignors to Jefferson Chemical Company, Inc.
Houston, Texas, a corporation of Delaware It is certified that error appears in the above-identified patent and that said Letters Patent are hereby corrected as shown below:

In the Claims, Claim 2, column 3, line 71, that portion of the formula reading ($C_3H_3O$) should read: ($C_3H_6O$).

SIGNED AND
SEALED
JUL 28 1970

(SEAL)
Attest:

Edward M. Fletcher, Jr.
Attesting Officer

WILLIAM E. SCHUYLER, JR.
Commissioner of Patents